United States Patent
Roberts et al.

(10) Patent No.: US 7,096,500 B2
(45) Date of Patent: Aug. 22, 2006

(54) PREDICTIVE MALWARE SCANNING OF INTERNET DATA

(75) Inventors: Guy William Welch Roberts, Milton Keynes (GB); Andrew Lewis Cole, Aylesbury (GB); Eamonn John Baulk, Rickmansworth (GB)

(73) Assignee: McAfee, Inc., Santa Clara, CA (US)

( * ) Notice: Subject to any disclaimer, the term of this patent is extended or adjusted under 35 U.S.C. 154(b) by 696 days.

(21) Appl. No.: 10/024,200

(22) Filed: Dec. 21, 2001

(65) Prior Publication Data

US 2004/0088570 A1    May 6, 2004

(51) Int. Cl.
- G06F 11/00 (2006.01)
- G06F 11/22 (2006.01)
- G06F 11/30 (2006.01)
- G06F 11/32 (2006.01)
- G06F 11/34 (2006.01)
- G06F 11/36 (2006.01)
- G06F 12/14 (2006.01)

(52) U.S. Cl. .................. 726/24; 709/206; 709/207; 709/229; 713/188

(58) Field of Classification Search ............ 709/229, 709/206, 207; 713/200, 188; 726/24
See application file for complete search history.

(56) References Cited

U.S. PATENT DOCUMENTS

| | | | | |
|---|---|---|---|---|
| 6,253,301 B1 * | 6/2001 | Razdan et al. | ............... | 711/202 |
| 6,721,721 B1 * | 4/2004 | Bates et al. | .................... | 707/1 |
| 6,728,886 B1 * | 4/2004 | Ji et al. | ........................ | 726/24 |
| 6,785,732 B1 * | 8/2004 | Bates et al. | ................. | 709/232 |
| 6,842,861 B1 * | 1/2005 | Cox et al. | ................... | 713/188 |
| 2002/0147780 A1 * | 10/2002 | Liu et al. | .................... | 709/206 |
| 2003/0191957 A1 * | 10/2003 | Hypponen et al. | .......... | 713/200 |

* cited by examiner

Primary Examiner—Emmanuel L. Moise
Assistant Examiner—Shewaye Gelagay
(74) Attorney, Agent, or Firm—Zilka-Kotab, PC; Christopher J. Hamaty

(57) ABSTRACT

E-mail messages or computer files are scanned to identify embedded internet addresses. These embedded internet address 18 refer to data that may be retrieved via the internet. This data is pre-emptively retrieved and scanned for malware even though it has not been requested by a user. If the data is found to be malware-free, then a record of this is kept. If a user subsequently seeks to access the data associated with the embedded internet address, then the stored data may be referred to and if the internet address is found and the data associated with that address is unchanged since it was previously scanned, then that data may be supplied to the user without the need to be rescanned.

28 Claims, 5 Drawing Sheets

PREDICTIVE MALWARE SCANNING OF INTERNET DATA

BACKGROUND OF THE INVENTION

1. Field of the Invention

This invention relates to the field of data processing systems. More particularly, this invention relates to the field of malware scanning, such as, for example, scanning for computer viruses, worms, Trojans, banned words etc, within data processing systems.

2. Description of the Prior Art

It is known to provide malware scanners that are able to scan data for the presence of malware such as computer viruses, worms, Trojans, banned words and other undesirable material. One type of malware scanner is resident upon a client computer or a server computer and serves to scan files for malware either on an on-access or an on-demand basis.

A significant source of malware is data downloaded via the internet. The anonymous and unregulated nature of the internet mean that it is relatively easy for a person to distribute malware via the internet, such as to unsuspecting users downloading programs or webpages that contain computer viruses or worms. In order to address this problem it is known to provide malware scanners that operate in conjunction with a computer network firewall such that data being retrieved from the internet through that firewall is scanned for malware. Whilst this is an effective protection, it suffers from the disadvantage that it slows the speed with which data requested by a user from the internet is returned to that user since the data is delayed within the firewall whilst it is scanned. This problem is made worse by the fact that there is an ever increasing number of malware threats, such as known viruses, worms, Trojans etc for which a search needs to be made within the data.

SUMMARY OF THE INVENTION

Viewed from one aspect the present invention provides a computer program product for controlling a computer to scan data accessible via an internet link for malware, said computer program product comprising:

(i) address identifying code operable to identify within currently held data at least one internet address associated with said currently held data;

(ii) retrieving code operable to retrieve via said internet link addressed data corresponding to said at least one internet address; and (iii) scanning code operable to scan said addressed data for malware.

The invention recognises and exploits the fact that data held on a computer will often include internet addresses that will at a subsequent time prompt a user to access data referred to by those internet addresses. Accordingly, if data held upon the computer is scanned for internet addresses, then the data that may be retrieved via the internet and associated with those internet addresses can be pre-emptively retrieved and scanned for malware. Consequently, when a user subsequently tries to access the data associated with such an internet address that has been pre-emptively scanned, then the scanning need not be repeated and access to the data may be provided more rapidly. This technique is also useful in load balancing in that at periods of relatively low utilisation of processing and communication resources pre-emptive downloading and scanning of data may take place so reducing the likelihood of bottlenecks occurring at other times.

In order to facilitate the invention preferred embodiments are operable to store result data identifying at least address data in which malware was not found. Caching of the results in this way, in combination with possibly also caching the scanned data itself can considerably increase efficiency. Caching internet data is not in itself a new technique and the methods for ensuring that a cached version of some data is the same as that currently accessible via the internet are known in the field.

The searching for internet addresses may be conducted in a variety of ways, but preferably is performed by searching for a string having a format that matches that of a pointer to an internet address.

Whilst the currently held data which is pre-emptively scanned for internet addresses could take a wide variety of forms, such as word processor documents, in preferred embodiments the currently held data includes received e-mail messages. This preferred feature recognises that received e-mail messages frequently contain internet addresses which subsequently prompt users to access the data referred to by those internet addresses. In addition, e-mail messages may be used to distribute internet addresses relating to malware. Accordingly, by scanning a relatively small amount of e-mail data, significant pre-emptive scanning may be achieved.

The malware being scanned for could take a wide variety of forms. However, preferred embodiments of the invention seek to detect one or more of computer viruses, worms, Trojans, banned computer programs, banned words or banned images.

The computer which searches for internet addresses and retrieves the corresponding address data before scanning it could have a variety of positions within a computer network, but in preferred embodiments is provided as a firewall computer via which internet traffic is passed to a local computer network. Such firewall computers are typically already provided within computer networks in order to give protection against unauthorised access to the local computer network via an internet connection and are such that all internet traffic passes through them. Accordingly, they make a convenient and secure place to provide the techniques described above to perform pre-emptive scanning for malware.

If malware is detected in the pre-emptive scanning, preferred embodiments are such that one or more malware found actions are triggered. These malware found actions could take a variety of forms but preferred embodiments are such that the malware found actions include one or more of preventing access to the currently held data, removing the internet address from the currently held data, preventing access to the address data, removing the malware form the address data to generate a clean copy to be supplied in place of the original, or blocking internet access to a computer detected to be seeking access to the internet address in which malware is found. Other malware found actions are also possible.

Other aspects of the invention also provide a method of scanning data accessible via an internet link and an apparatus for scanning data accessible via an internet link in accordance with the above described techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figures 1, 2, 3:
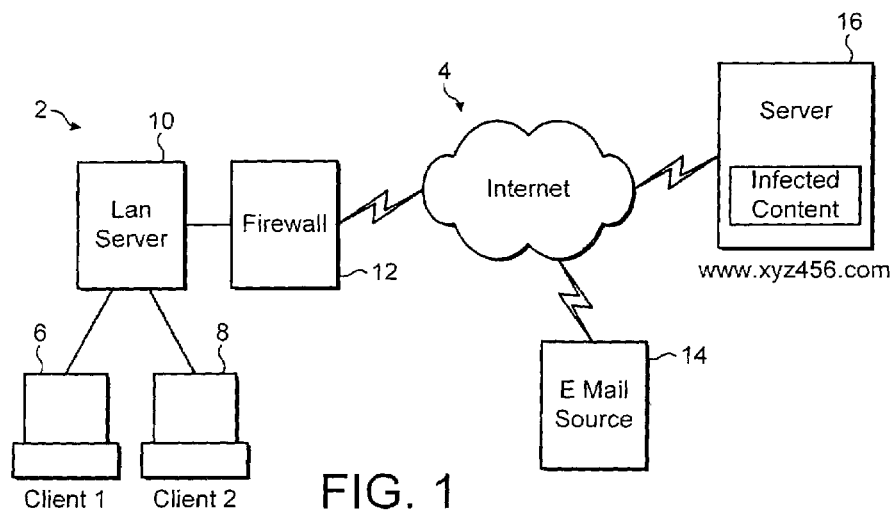
FIG. 1 schematically illustrates a local computer network connected via the internet to a source of e-mail messages and a server providing data via the internet.
FIG. 2 schematically illustrates an e-mail message containing an embedded internet address.
FIG. 3 schematically illustrates a word processor document containing an embedded internet address.

FIG. 1 illustrates a local area network 2 connected to the internet 4. The individual client computers 6, 8 connect to a local area network server 10. The local area network server 10 connects to the internet 4 via a firewall computer 12. The firewall computer 12 is responsible for applying security measures to resist unauthorised access to the local area network 2 via the internet 4. The firewall computer 12 may also perform malware scanning on received e-mail messages, attachments and internet webpage content received from the internet 4. Also connected to the internet are an e-mail source computer 14 from which e-mail messages or via which e-mail messages may pass to the local area network 2. An internet server 16 acts as a host for internet webpages that may be accessed by computers upon the local area network 2. This particular internet server 16 contains some webpage contents that is infected with malware, such as a computer virus or banned words or images.

FIG. 2 schematically illustrates an e-mail message that may be received by a computer on the local area network 2 and that contains an internet address 18. E-mail client software is such that when a user is reading such an e-mail they may simply "click" upon the embedded internet address in order to trigger their internet browser to access the webpage associated with that internet address. If that internet address contains malware (such as the webpage on the internet server 16), then this malware would at that stage be introduced to the client computer via the webpage being accessed. The content of the e-mail message may be such as to encourage an unsuspecting user to access the webpage containing the malware and so become infected with the malware.

FIG. 3 illustrates an alternative situation in which a computer file in the form of a word processor document contains within it an embedded internet address. In a similar way to e-mail messages, embedded internet addresses within documents may be highlighted by the application program used to view that document in a manner such that a user may simply "click" upon the internet address to trigger their browser to access that webpage, with any malware which it contains then being introduced to the client computer concerned. The other content of the word processor document may be such that the user is encouraged to access that webpage or regard that webpage as containing entirely innocent content. The present technique may be generally used with stored data of a wide variety of forms (e.g. documents, applications, media files, etc) that may contain an embedded internet address.

Figure 4:
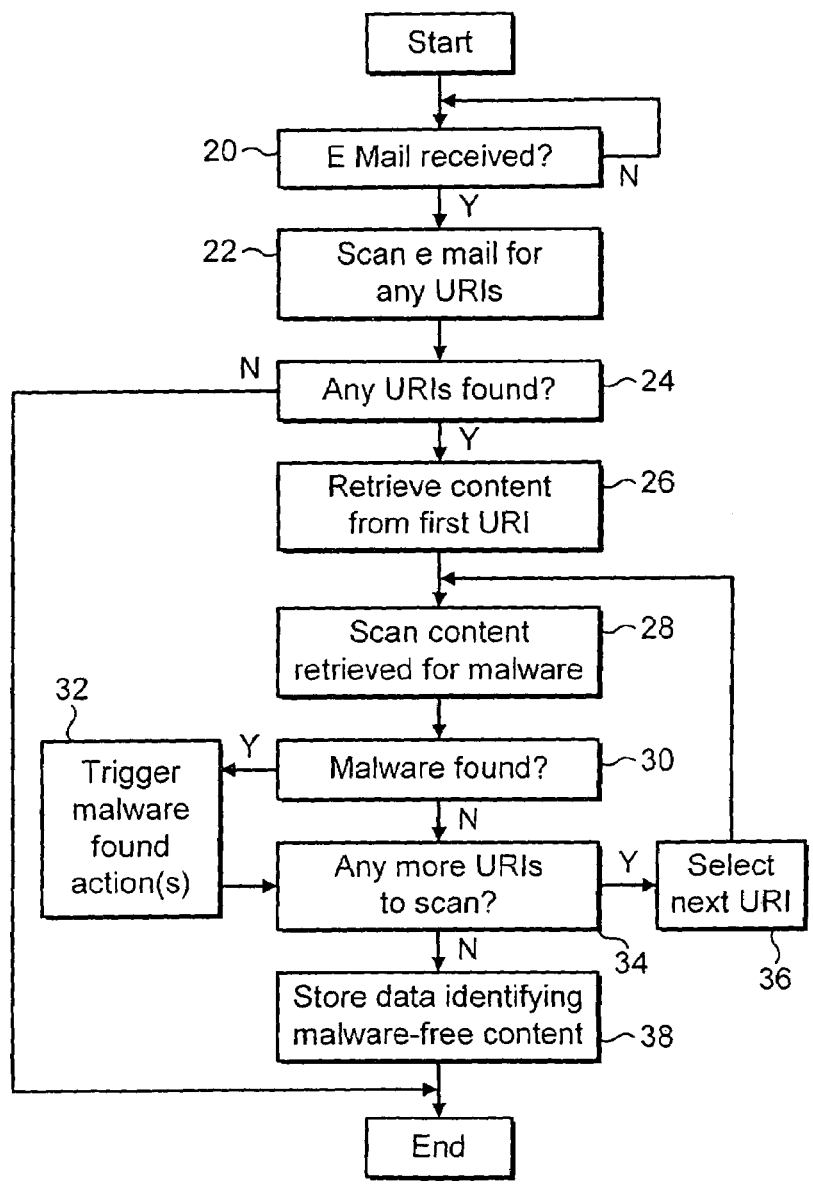
FIG. 4 is a flow diagram schematically illustrating the scanning of e-mail messages for internet addresses that may then be pre-emptively scanned for malware.

FIG. 4 is a flow diagram illustrating a pre-emptive scanning technique. At step 20, the firewall computer 12 waits until an e-mail message is received. When an e-mail message has been received, then step 22 serves to scan through the e-mail message for any internet addresses or links or pointers to internet addresses. These internet addresses may be identified as text strings adding a particular format, e.g. containing "/" and/or "." symbols. The manner in which internet addresses embedded within such documents may be identified can be the same as the way these embedded internet addresses are identified by the client e-mail computer programs or the word processor programs discussed above in relation to FIGS. 2 and 3 and that serve to highlight identified internet addresses and make them available for triggering browser access.

Step 24 determines whether any internet addresses have been found within the receive e-mail. If no internet addresses have been found, then the process terminates. If one or more internet addresses have been found, then step 26 serves to retrieve the data content associated with the first internet address found. This content may be retrieved to the firewall computer 12 via the internet 4 with the firewall computer 12 making a request for the addressed internet webpage in the same manner as a client computer browser. It will be appreciated that the data to be retrieved via the internet 4 could take forms other than webpages, such as, for example, computer files to be transferred using FTP mechanisms or the like.

At step 28 the retrieved content returned at step 26 is scanned for malware, such as the presence of computer viruses, worms, Trojans, banned words, banned computer files, banned images and the like. This malware scanning can use conventional malware scanning mechanisms, such as those produced by Network Associates Inc., and these will not be described further.

Step 30 determines whether any malware was identified by the scan performed at step 28. If malware was found, then processing proceeds to step 32 at which one or more malware found actions is triggered. These malware found actions may be configured by the user to include one or more of preventing access to the currently held data which contains the internet address pointing to malware (e.g. quarantining the e-mail or data file concerned); removing the internet address from the currently held data (e.g. stripping the internet address from the e-mail or the data file and possibly replacing it with a marker indicating that it has been removed because it pointed to malware); blocking access to the addressed data; removing the malware from the addressed data to provide a clean copy and storing this clean copy for supply in place of the malware containing addressed data should a user seek to access that malware containing addressed data; and blocking internet access for any computer that seeks to access the internet address containing the malware. It will be appreciated that further or alternative malware found actions could be initiated if desired. After step 32, or after step 30 if no malware is found, processing proceeds to step 34 at which a determination is made as to whether or not there are any more internet addresses within the e-mail that was scanned at step 22 that require examination. If there are such further internet addresses requiring examination, then the next of these is selected at step 36 and processing returns to step 28. If there are no more internet addresses requiring pre-emptive scanning, then processing proceeds to step 38.

Step 38 serves to store data identifying malware-free content that may be accessed over the internet. This may take the form of a database storing internet addresses that have been pre-emptively scanned for malware content in accordance with the previous steps and found not to contain malware (together with page version identifying data such as a date, filesize, checksum etc.) A cached version of the pre-emptively scanned data referred to by the internet addresses may also be stored if the storage capacity of the scanning device so permits. If some data addressed by an internet address was found to contain malware but a cleaned version of the data was prepared and stored locally, then the internet address may be stored within the database of the malware-free content (it is desirable in the case of the preparation of a malware-free copy to store that cleaned malware-free copy of the data at a known new location and replace the original internet address than an address pointing to that clean data at a known new location). After the data identifying the malware-free content has been stored at step 38, processing either terminates or returns to step 20 to await the next e-mail to be scanned.

Figure 5:
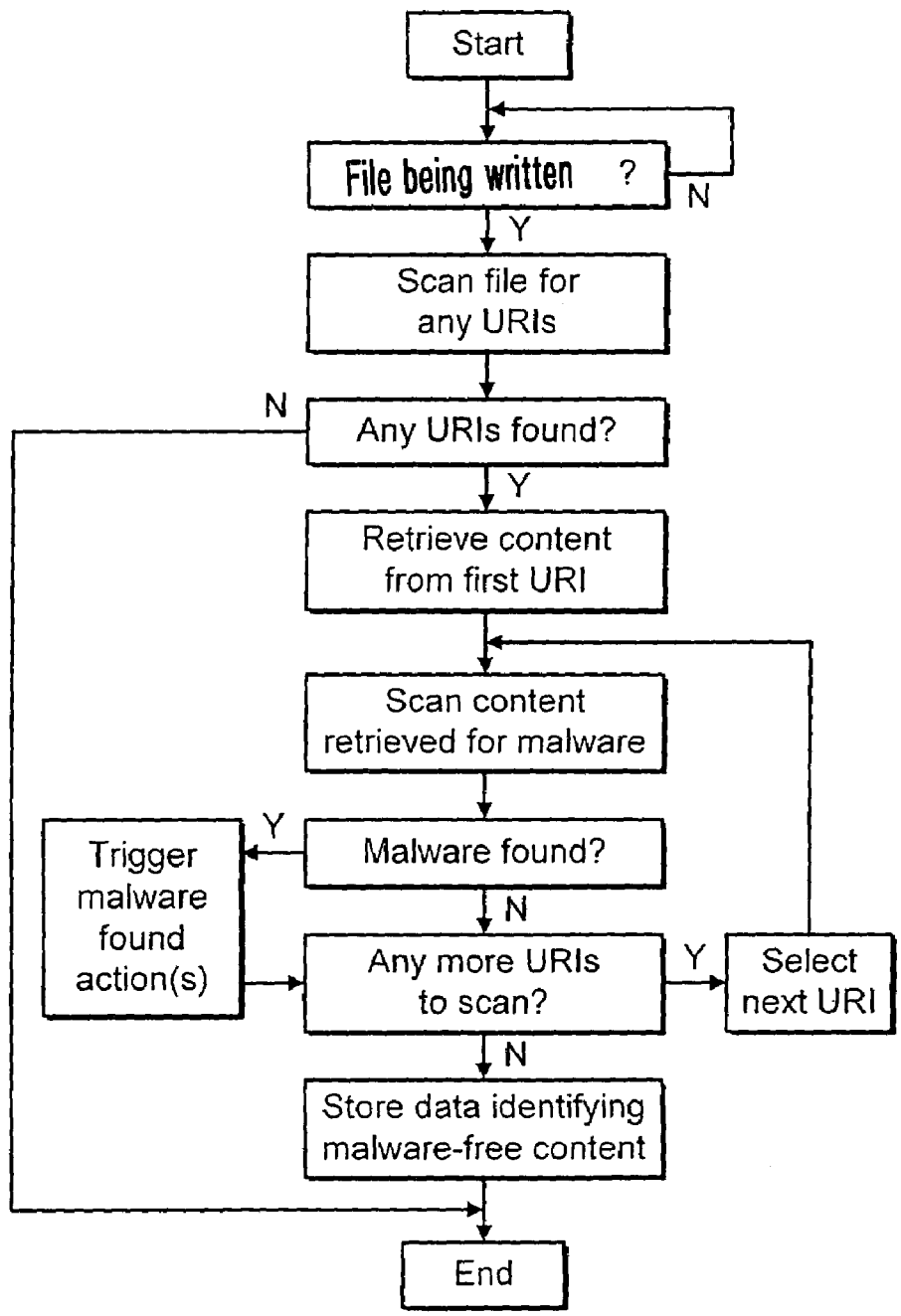
FIG. 5 is a flow diagram schematically illustrating the scanning of a data file being written for internet addresses that may then be pre-emptively scanned for malware.

FIG. 5 is a flow diagram illustrating a pre-emptive malware scanning mechanism similar to that of FIG. 4, but in this case a file being written to either the firewall computer 12, the local area network server 10 or either of the client computers 6, 8 serves in place of the e-mail message as the entity to be scanned for internet addresses that may trigger subsequent access to data via the internet 4. The files being scanned may be word processor document files, database files, spreadsheets or any other type of data that may contain a pointer to some malware content. Scanning within these files for internet addresses may be performed in a manner similar to that for scanning e-mail messages, e.g. searching for strings of characters having the characteristics of internet addresses in their format and/or syntax. The processing steps in the remainder of FIG. 5 after the initial scanning are the same or highly similar to those of FIG. 4 and will not be described further herein.

Figure 6:
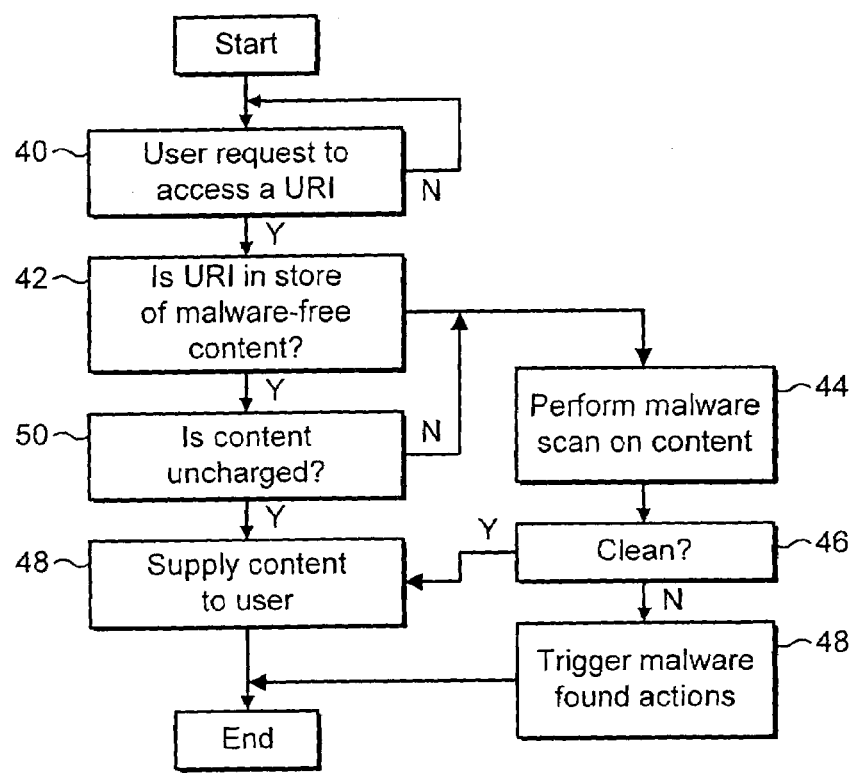
FIG. 6 is a flow diagram schematically illustrating a user request to an internet address being checked against pre-emptively scanned internet addresses.

FIG. 6 is a flow diagram illustrating processing that occurs when a user seeks to access data referred to by an internet address. At step 40 the firewall computer 12 waits until it receives an access request generated by a user seeking to access data stored at a particular internet address. When such a request has been received, processing proceeds to step 42 at which a check is made within the database storing internet addresses that have been pre-emptively scanned and found to contain malware-free content as written in step 38 of FIG. 4. If the internet address being accessed is not one that has been pre-emptively scanned and found to be malware-free, then processing proceeds to step 44 at which a standard malware scan is performed upon the content prior to it being returned to the user. A level of recursive scanning may be performed upon the web page whereby links on the webpage are also followed and scanned (e.g. to one level down). If step 46 finds that the data is free from malware, then processing proceeds to step 48 at which the data is returned from the firewall computer 12 to the requesting computer and processing terminates. If the test at step 46 indicated that the retrieved data contained malware, then malware found actions are triggered at step 48 in a manner similar to those discussed in relation to step 32 of FIG. 4.

If the test at step 42 indicated that the internet address being accessed was one that had been pre-emptively scanned and found not to contain malware, then processing proceeds to step 50 at which a check is made as to whether or not the content associated with that address has changed since it was scanned. This type of checking whether or not an internet page has changed may be similar to that performed by a webpage caching mechanism. One way of achieving this is to checksum the webpage when it was pre-emptively scanned, store that checksum and then compare that checksum against a new checksum derived from the retrieved webpage when the user requests access. If the checksums match, then the webpage may be assumed to not have been changed in the intervening period and not require rescanning for malware prior to being returned to the requester. Another mechanism may use dates or other information embedded within the webpage being accessed to determine its currency and status. Other possibilities would be that a cleaned version of a webpage that had previously been found to contain malware could have been prepared and stored locally to be supplied in place of the infected webpage when a request to access that infected webpage was made. Known clean webpages might also be stored for direct supply along with the addresses confirming that they were malware-free in a modified type of webpage caching arrangement.

If the test at step 50 is that the content of the webpage being accessed in unchanged, then that webpage is supplied to the user at step 48 prior to termination of the process or returned to step 40. If the content is determined at step 50 to be changed, then processing proceeds to step 44 at which a standard malware scan is performed. In this case even thought the webpage had been pre-emptively scanned for malware, the webpage has since changed and so it is not safe to assume that it is still free from malware and accordingly it should be rescanned. When the virus/malware definition data used by the scanner is updated, then the store of malware-free addresses is flush or pre-emptively rescanned.

It will be appreciated that if a webpage being requested has been pre-emptively scanned for malware and been found to be malware-free, then an unchanged version of that webpage may subsequently be supplied to a user without having to be rescanned for malware whilst maintaining the protection to the system against malware infection. The avoidance of the need to scan for malware subsequent to the user's request for the data and before the data is supplied increases the speed with which that data may be supplied to a user and generally spreads out the processing load on the system concerned.

Figure 7:
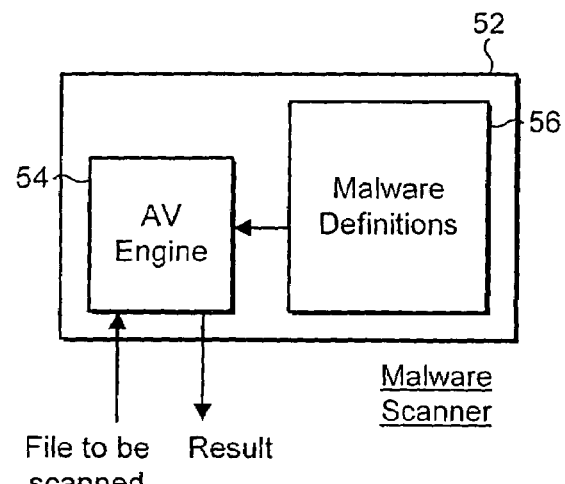
FIG. 7 schematically illustrates a malware scanner.

FIG. 7 schematically illustrates a malware scanner 52. Such a malware scanner typically includes a scanning engine 54 and an associated library of data 56 identifying malware for which a scan is being made. In operation the malware scanner 52 may be passed to the file to be scanned by the operating system and then return a result indicating whether or not the file contains malware to the operating system. The hooks into the operating system may be at a relatively low level and provided by a redirect of file access requests to the malware scanner 52 prior to them being serviced by the operating system in the normal way. The library of malware defining data 56 can include data defining computer viruses, wormns, Trojans, banned computer files, banned words, banned images etc. Malware scanners of a variety of different types may be advantageously used in combination with the pre-emptive scanning technique described above. The malware scanner may also perform memory and other types of scanning operation.

Figure 8:
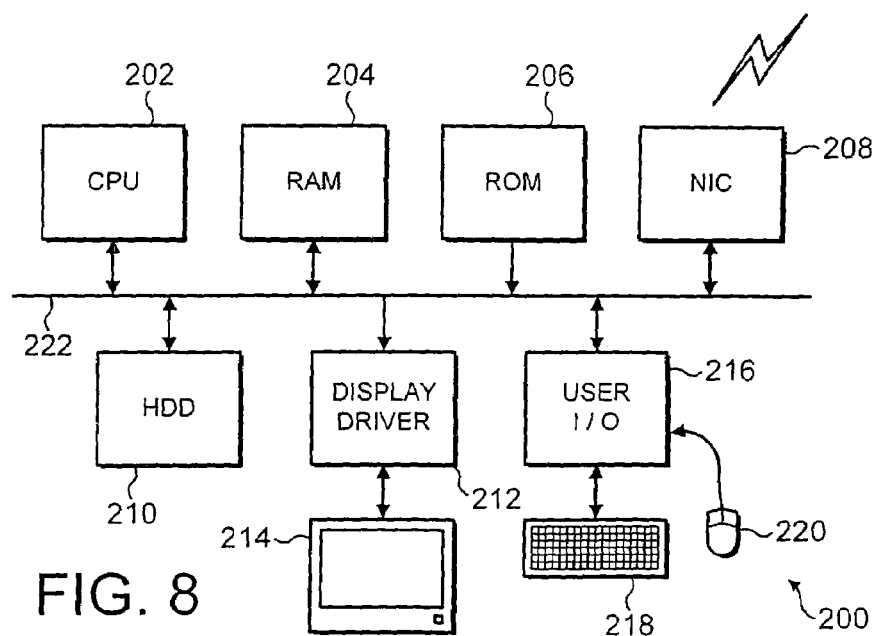
FIG. 8 schematically illustrates a general purpose computer of the type that may be used to implement the techniques described herein.

FIG. 8 schematically illustrates a general purpose computer 200 of the type that may be used to implement the above described techniques. The general purpose computer 200 includes a central processing unit 202, a random access memory 204, a read only memory 206, a network interface card 208, a hard disk drive 210 (as an example of a data storage device), a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 8 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product stored on a computer-readable medium for controlling a computer to scan data accessible via an internet link for malware, said computer program product comprising:
    (i) address identifying code operable to identify within currently held data at least one internet address associated with said currently held data;
    (ii) receiving code operable to pre-emptively retrieve, via said internet link, an addressed data that would be, but has not yet been, accessed by a user following said at least one internet address, after identifying within said currently held data said at least one internet address associated with said currently held data;
    (iii) scanning code operable to pre-emptively scan said addressed data that was pre-emptively retrieved utilizing said internet link for malware; and
    (iv) storing code operable to store result data identifying at least addressed data in which malware was not found;
    wherein said addressed data is cached after said addressed data has been pre-emptively retrieved and pre-emptively scanned, but before said addressed data has been accessed by said user.

2. A computer program product as claimed in claim 1, wherein said address identifying code is operable to search within said currently held data for string data having a format matching a pointer to an internet address.

3. A computer program product as claimed in claim 1, wherein said currently held data includes received e-mail messages.

4. A computer program product as claimed in claim 1, wherein said scanning code is operable to seek to detect within said addressed data one or more of:
    computer Viruses;
    worms;
    Trojans;
    banned computer programs;
    banned words; or banned images.

5. A computer program product as claimed in claim 1, wherein said computer is a firewall computer via which internet truffle is passed to a local computer network.

6. A computer program product as claimed in claim 1, wherein if malware is detected within said addressed data, ten one or more malware found actions are triggered.

7. A computer program product as claimed in claim 6, wherein said malware found actions include removing said at least one internet address from said currently held data.

8. A computer program product as claimed in claim 1, wherein said malware found actions including at least one of:
    (i) preventing access to said currently held data;
    (ii) removing said at least one internet address from said currently held data;
    (iii) preventing access to said addressed data;
    (iv) removing said malware from said addressed data to generate clean addressed data and supplying said clean addressed data in place of said addressed data;
    (v) blocking internet access by a computer detected to be seeking to access said at least one internet address.

9. A computer program product as claimed in claim 1, wherein said currently held data is an e-mail and said internet address is an internet link embedded in said e-mail.

10. A computer program product as claimed in claim 1, wherein said currently held data is a file and said internet address is an internet link embedded in said file.

11. A computer program product as claimed in claim 1, wherein addressed data determined to contain malware via said scan is cleaned and said clean addressed data is stored locally for access via said internet address.

12. A computer program product as claimed in claim 1, wherein access to said addressed data is allowed if said result data associated with said addressed data identifies said addressed data as not containing malware and if said addressed data has not changed since it was last scanned.

13. A computer program product as claimed in claim 1, wherein storing said result data identifying at least addressed data in which malware was not found includes storing said result data in a database with an associated date of last scan and at least one of a file size and a checksum associated with said addressed data in which malware was not found.

14. A computer program product as claimed in claim 1, wherein addressed data in which malware was found is cleaned and said clean addressed data is stored locally for access via an updated internet address that replaces said internet address.

15. A method of scanning data accessible via an internet link for malware, said method comprising:
    (i) identifying within currently held data at least one internet address associated with said currently held data;
    (ii) after identifying within said currently held data said at least one internet address associated with said currently held data, pre-emptively retrieving, via said internet link, an addressed data that would be, but has not yet been, accessed by a user following said at least one internet address;
    (iii) pre-emptively scanning said addressed data that was pre-emptively retrieved utilizing said internet link for malware; and (iv) storing result data identifying at least addressed data in which malware was not found;

wherein said addressed data is cached after said addressed data has been pre-emptively retrieved and pre-emptively scanned, but before said addressed data has been accessed by said user.

16. A method as claimed in claim 15, wherein said identifying includes searching within said currently held data for string data having a format matching a pointer to an internet address.

17. A method as claimed in claim 15, wherein said currently held data includes received e-mail messages.

18. A method as claimed in claim 15, wherein said scanning seeks to detect within said addressed data one or mare of:
   computer viruses;
   worms;
   Trojans;
   banned computer programs;
   banned words; or banned images.

19. A method as claimed in claim 15, wherein said method is performed by a firewall computer via which internet traffic is passed to a local computer network.

20. A method as claimed in claim 15, wherein if malware is detected within said addressed data, then one or more malware found actions are triggered.

21. A method as claimed in claim 15, wherein said malware found actions including at least one of:
   (i) preventing access to said currently held data;
   (ii) removing said at least one internet address from said currently held data;
   (iii) preventing access to said addressed data;
   (iv) removing said malware from said addressed data to generate clean addressed data and supplying said clean addressed data in place of said addressed data;
   (v) blocking internet access by a computer detected to be seeking to access said at least one internet address.

22. Apparatus for scanning data accessible via an internet link for malware, said apparatus comprising:
   (i) address identifying logic operable to identify within currently held data at least one internet address associated with said currently held data;
   (ii) retrieving logic operable to pre-emptively retrieve via said internet link addressed data that would be, but has not yet been, accessed by a user following said at least one internet address, after identifying within said currently held data said at least one internet address associated with said currently held data;
   (iii) scanning logic operable to pre-emptively scan said addressed data that was pre-emptively retrieved utilizing said internet link for malware; and
   (iv) storing logic operable to store result data identifying at least addressed data in which malware was not found;

wherein said addressed data is cached after said addressed data has been pre-emptively retrieved and pre-emptively scanned, but before said addressed data has been accessed by said user.

23. Apparatus as claimed in claim 22, wherein said address identifying logic is operable to search within said currently held data for string data having a format matching a pointer to an internet address.

24. Apparatus as claimed in claim 22, wherein said currently held data includes received e-mail messages.

25. Apparatus as claimed in claim 22, wherein said scanning logic is operable to seek to detect within said addressed data one or more of:
   computer viruses;
   worms;
   Trojans;
   banned computer programs;
   banned words; or banned images.

26. Apparatus as claimed in claim 22, wherein said computer is a firewall computer via which internet traffic is passed to a local computer network.

27. Apparatus as claimed in claim 22, wherein if malware is detected within said addressed data, then one or more malware found actions are triggered.

28. Apparatus as claimed in claim 22, wherein said malware found actions including at least one of:
   (i) preventing access to said currently held data;
   (ii) removing said at least one internet address from said currently held data;
   (iii) preventing access to said addressed data;
   (iv) removing said malware from said addressed data to generate clean addressed data and supplying said clean addressed data in place of said addressed data;
   (v) blocking internet access by a computer detected to be seeking to access said at least one internet address.

* * * * *